United States Patent
Flanders et al.

(10) Patent No.: US 7,869,889 B2
(45) Date of Patent: Jan. 11, 2011

(54) DISTRIBUTED AND ADAPTIVE SMART LOGIC WITH MULTI-COMMUNICATION APPARATUS FOR RELIABLE SAFETY SYSTEM SHUTDOWN

(75) Inventors: Patrick S. Flanders, Dhahran (SA); Abdelghani Daraiseh, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 321 days.

(21) Appl. No.: 12/217,306

(22) Filed: Jul. 2, 2008

(65) Prior Publication Data

US 2010/0004761 A1    Jan. 7, 2010

(51) Int. Cl.
| | |
|---|---|
| G05B 11/01 | (2006.01) |
| G05B 9/02 | (2006.01) |
| G01N 37/00 | (2006.01) |
| G08B 21/00 | (2006.01) |
| G08B 13/00 | (2006.01) |

(52) U.S. Cl. .............................. 700/79; 700/21; 700/80; 700/81; 700/82; 702/114; 702/118; 702/184; 340/540; 340/541; 340/679

(58) Field of Classification Search .................. 700/21, 700/79–82; 702/114, 118, 184; 340/540–541, 340/679
See application file for complete search history.

(56) References Cited

U.S. PATENT DOCUMENTS

| | | | | |
|---|---|---|---|---|
| 4,283,634 | A * | 8/1981 | Yannone et al. | 290/40 R |
| 5,825,664 | A * | 10/1998 | Warrior et al. | 700/7 |
| 6,243,657 | B1 * | 6/2001 | Tuck et al. | 702/150 |
| 6,298,454 | B1 * | 10/2001 | Schleiss et al. | 714/37 |
| 6,370,127 | B1 * | 4/2002 | Daraiseh et al. | 370/328 |
| 6,370,448 | B1 * | 4/2002 | Eryurek | 700/282 |
| 6,532,392 | B1 * | 3/2003 | Eryurek et al. | 700/54 |
| 6,862,547 | B2 * | 3/2005 | Snowbarger et al. | 702/114 |
| 7,385,796 | B2 * | 6/2008 | Flanders | 361/104 |
| 7,504,961 | B2 * | 3/2009 | Flanders | 340/679 |
| 2004/0260408 | A1 * | 12/2004 | Scott et al. | 700/20 |
| 2008/0082184 | A1 * | 4/2008 | Murakami | 700/79 |

OTHER PUBLICATIONS

Int'l Search Report, Aug. 4, 2009.

* cited by examiner

*Primary Examiner*—Ramesh B Patel
(74) *Attorney, Agent, or Firm*—Abelman, Frayne & Schwab (57) ABSTRACT

This invention relates to safety instrumented systems ("SIS") for monitoring and controlling chemical and other industrial process field devices, and that are responsive to signals for the emergency shutdown of the process or system. The patent will significantly improve the reliability of communications within an emergency shutdown system, reduce unwanted trips, and adapt to process conditions by failing to a safe mode in dynamic conditions that are not considered by prior art logic solvers.

35 Claims, 6 Drawing Sheets

STATE-BASED SMART LOGIC DECISION DIAGRAM FOR SLM-2

DESIGN DIAGRAM FOR SP 100 OVER FF-SIS AND DESIGN LOGIC FUNCTION

FIG. 5     DESIGN DIAGRAM FOR SP100 OVER FF-SIS AND DESIGN LOGIC FUNCTION

FIG. 6

DISTRIBUTED AND ADAPTIVE SMART LOGIC WITH MULTI-COMMUNICATION APPARATUS FOR RELIABLE SAFETY SYSTEM SHUTDOWN

FIELD OF THE INVENTION

This invention relates to safety instrumented systems ("SIS") for monitoring and controlling chemical and other industrial process field devices, and that are responsive to signals for the emergency shutdown of the process or system. The patent will significantly improve the reliability of communications within an emergency shutdown system, reduce unwanted trips, and adapt to process conditions by failing to a safe mode in dynamic conditions that are not considered by prior art logic solvers.

BACKGROUND OF THE INVENTION

Oil refineries, chemical manufacturing and processing plants and other facilities have established relatively sophisticated safety systems that include shut-off valves, automated valve controllers that will cause the valve to move from a steady-state or safe processing position (whether it be open or closed) to an emergency shutdown position. These emergency shutdown valves and controllers must be tested periodically to assure that they will be operable and responsive to emergency electronic signals, that they can physically move from the steady-state process position to a shutdown position, and that this movement can be accomplished without the application of forces beyond a predetermined range.

The prior art has developed hardwired electronic communication systems, including fiber optic systems, that rely on the transmission of electrically-generated signals. These prior art hardwired networks convey the safety demand signal from a safety logic solver ("SLS") to an emergency shutdown valve or controller. Thus, if a break or failure were to occur in a circuit due to a fire, explosion, falling piece of equipment, corrosion on a terminal block, or the like, the process would either suffer an unnecessary shutdown or be exposed to risk of a safety demand without means of providing the required isolation and communications with valve controllers and alarm devices ("field process devices").

As used herein, the term "demand signal" means a characteristic signal that indicates a predetermined dangerous condition that warrants shutting down all or a predetermined portion of the process. Due to the limitations of the prior art communication systems, a degraded or failed signal transmission could lead to a "false alarm," whereby a demand signal would be generated, creating a nuisance trip or shutdown of the process. As used herein, the term "true demand signal" means a characteristic signal that reflects a dangerous condition such as overheating, a pump failure, a blocked flow line or some other dangerous condition directly related to the industrial process, for which an emergency shutdown is warranted.

The Safety Integrity Level ("SIL") defines the risk reduction target for a particular Safety Instrumented Function ("SIF") or emergency shutdown ("ESD") loop. SIL1 relates to a risk reduction of 10, SIL2 to a risk reduction of 100 and SIL3 relates to a risk reduction target of 1000. The required risk reduction is defined during the Quantitative Risk Assessment ("QRA") study of the process and involves the application of corporate risk criteria that define the tolerance for risk. The inverse of the risk reduction target is the Probability of Failure on Demand ("PFD"). The PFD is an important factor used to quantitatively verify the ability of a given SIF to meet the process safety requirements. This calculation is performed using dangerous failure rates assigned to each device that makes up the SIF together with prescribed test intervals and coverage factors for each device. The PFD is used by a system designer, together with the dangerous fault tolerant architecture requirements for each SIL defined in EC 61511 and the process safety time to configure the field process devices in a way that satisfies the safety requirements.

Due to the complexity of the safety instrumented systems of the prior art, the occurrence of faults and defects that cause an unnecessary shutdown of some or all of the systems is not uncommon. The safety systems of the prior art rely on "on/off" logic that does not permit a fault to be separately distinguished from a true demand signal. Therefore, using prior art protocols, the system must always decide whether to "fail-safe" and possibly experience unwanted nuisance trips or to "fail-steady" and risk an undetected dangerous failure or condition developing in the industrial process that would prevent operation of the safety function when a real emergency occurs.

A major deficiency in the prior art systems is the lack of a method that will trip the process on true demand signal only. Trip-on-demand only systems utilize redundant and diverse communications and embedded logic in safety critical field devices to recognize and trip only on true demand signal and to fail-steady when internal failures of the device or the communications network are detected.

As used herein, the term "field devices" includes sensors and final elements. Final elements include pumps, valves, valve actuators and the like. Sensors include switches and transmitters for monitoring a wide variety of variables, including, but not limited to, valve position, torque, level, temperature, pressure, flow, power consumption, and pH. As used herein, the term "communication faults" means conditions ranging from a complete failure to errors and degradations of the signal that prevent a determination of the true condition of the signal-generating source.

This description employs other terminology that is well known in the process safety instrument field. The preferred hardwired system is known as the Fieldbus Foundation-Safety Instrumented System ("FF-SIS"). The installation of hardwired field instrumentation connected on a one-to-one basis with SLS input/output channels is costly. The use of the safety certified FF-SIS communications protocol provides a multi-drop architecture that reduces installation costs of safety instrumented systems. Field devices of the prior art include very limited device self-diagnostics and definable failure states. Conventionally designed systems lack the ability to distinguish between a true demand signal and a communications fault at the field device level, and must therefore use an "on/off" approach where the process is shut down in response to a true demand signal or a fault in the field wiring, when the system receives an indication (whether true or false) that a signal has changed states.

Because FF-SIS devices share a common hardwired multi-dropped communications segment, there is the potential for an increase in uninitiated or nuisance process shutdowns ("trips"). Safety certification of the FF-SIS multi-drop communications for safety instrumented systems assumes that upon loss of communications between the SLS and the field devices, the relevant final elements will respond by taking the process to the fail-safe state. While this procedure is "safe," operators of major oil/gas processing facilities object to the productivity losses that occur with process shutdowns due to communications errors or self-diagnosed device faults. The new FF-SIS protocol does allow configuration of the final elements to "fail-steady" and initiate an alarm at the SLS level, but falls short of providing a completely redundant and diverse alternative communications path to verify the SLS shutdown command or report loss of communications to neighboring field sensors and final elements.

It is the conventional design practice of the prior art to connect field devices (i.e., sensors and final elements) to an SLS or certified programmable logic controller via hardwired networks on a one-to-one basis. Benefits of FF-SIS include a significant reduction of the installed cost of safety instrumentation due to multi-drop wiring, improved capabilities of each field device to detect potentially dangerous internal failures ("device self-diagnostics"), and the ability to communicate detected faults directly to the SLS ("field device-logic solver integration").

With conventional systems, field device faults are only detected during scheduled "proof testing," typically scheduled at quarterly or annual intervals. The field devices of the prior art cannot perform self-diagnostics at the field level and communicate their respective "health" or operational status back to the SLS over a safety certified communications network.

It would therefore be desirable to provide an improved safety instrumented system, whereby device failures are communicated to the SLS in "real time" so that corrective action can be taken, avoiding false tripping and the associated economic costs that come with process disruptions.

SUMMARY OF THE INVENTION

The present invention broadly comprehends a safety instrumented system that provides redundant lines of communication from the field process devices to an SLS or other system monitoring and control means.

In one embodiment of the invention, a signal received over a hardwired communications network is compared with a signal received over a wireless communications network. If a signal from one network would normally trigger a shutdown action, but the corresponding wireless signal from the other network is normal (i.e., not warranting any safety response), then the system would maintain steady-state operation. On the other hand, if a demand signal is received on one network while the other network has a compromised or degraded signal (or no signal at all), then the SLS would activate a shutdown of all relevant portions of the involved industrial process, in accordance with the standard safety operating protocol.

The preferred wireless system is the SP100 wireless standard ("SP100"), though as will be apparent to those of ordinary skill in the art, other standards, such as ZIGBEE™, Wireless LAN (including IEEE 802.11), Wireless PAN (including IEEE 802.15), and Wireless Hart, are suitable and may be substituted. The preferred hardwired system is the FF-SIS, though other suitable standards exist and may be substituted.

A second aspect of the invention is directed to a method of testing both the hardwired and wireless communication systems to determine whether they are operable, i.e., that they are capable of transmitting clear signals. This is also referred to as determining the "health" of the system, a portion of the system, or a field sensor or final element.

In a preferred embodiment, the invention comprehends a novel system that combines the communications of a hardwired FF-SIS with a wireless SP100 system and associated novel risk-based state-based decision logic by which new messaging sequences are carried over the wireless SP100 network to increase decision reliability for a safety instrumented system. This configuration provides redundant and diverse communications paths that permit greater flexibility when configuring the failure states for FF-SIS compliant sensors and final elements upon detection of degraded and "loss of communications" states.

When the SP100 wireless communications network is operationally functional, the end user will have the flexibility of keeping field devices active and the process operating under defined normal conditions while appropriate action is taken to address any faults detected within the FF-SIS communications network. If the wireless communications network is lost prior to correcting the detected FF-SIS communications fault, each final element takes the defined safe action for the tier of FF-SIS communications loss and wireless loss. If a final element receives a true demand signal via the wireless or FF-SIS communications networks, the element moves to the safe state, thereby providing a 1-out-of-2 action upon receipt of a verified true demand signal. As noted above, the term "true demand signal" refers to a condition which warrants a shutdown of the controlled industrial process, as distinguished from a false or nuisance trip.

In another preferred embodiment, the SLS includes memory in which is stored the predetermined safe operating range for signals representing all functions of each field device in communication with the SLS.

In one aspect of this embodiment, the SLS is programmed to sequentially transmit a "reporting signal" to a plurality of field devices, each of which are programmed to respond with a "device report signal," or series of signals. The SLS compares the device report signal(s) with the safe operating range stored in the memory and makes a determination of the condition or "health" of the field device. If one or more device report signals fall outside of the stored safe operating range value, a "fault record" is entered in the memory component and a predetermined form of audible and/or visible alarm is actuated.

The responsive action of the SIS is predetermined by the nature of the device and the fault recorded. For example, if a fault report is entered for one of a multiple set of redundant temperature sensors on an unpressurized reactor, no shutdown is warranted, and the fault can be signaled and reported to maintenance personnel for prioritized sensor replacement in accordance with other schedule maintenance. If a partial test of an EIV indicates an excessive power requirement to initiate value movement, the SLS can report a fault and call for immediate action by maintenance personnel.

In the event that a non-redundant EIV is signaled to initiate a partial stroke test and both the hardwired and wireless systems generate fault reports indicating that no movement was detected, the system of the invention can respond in either of two ways:

1. A danger alarm is initiated and a "shutdown delay clock" begins a preprogrammed count down of predetermined duration that is based on the SIL, allowing personnel to check the device (via physical visit or remote sensing) to confirm its inoperability and either shutdown the system manually or interrupt the shutdown delay clock in order to provide time to take corrective action; or 2. The emergency shutdown is initiated immediately upon determination that both wired and wireless signal reported no EIV movement.

In either case, action is taken based on a two-out-of-two analysis.

BRIEF DESCRIPTION OF THE DRAWINGS

Further advantages and features of the present invention will become apparent from the detailed description of the invention with reference to the accompanying drawings, in which.

DETAILED DESCRIPTION OF INVENTION

Reference will now be made in detail to implementations of the invention, examples of which are illustrated in the accompanying drawings.

Figure 1:
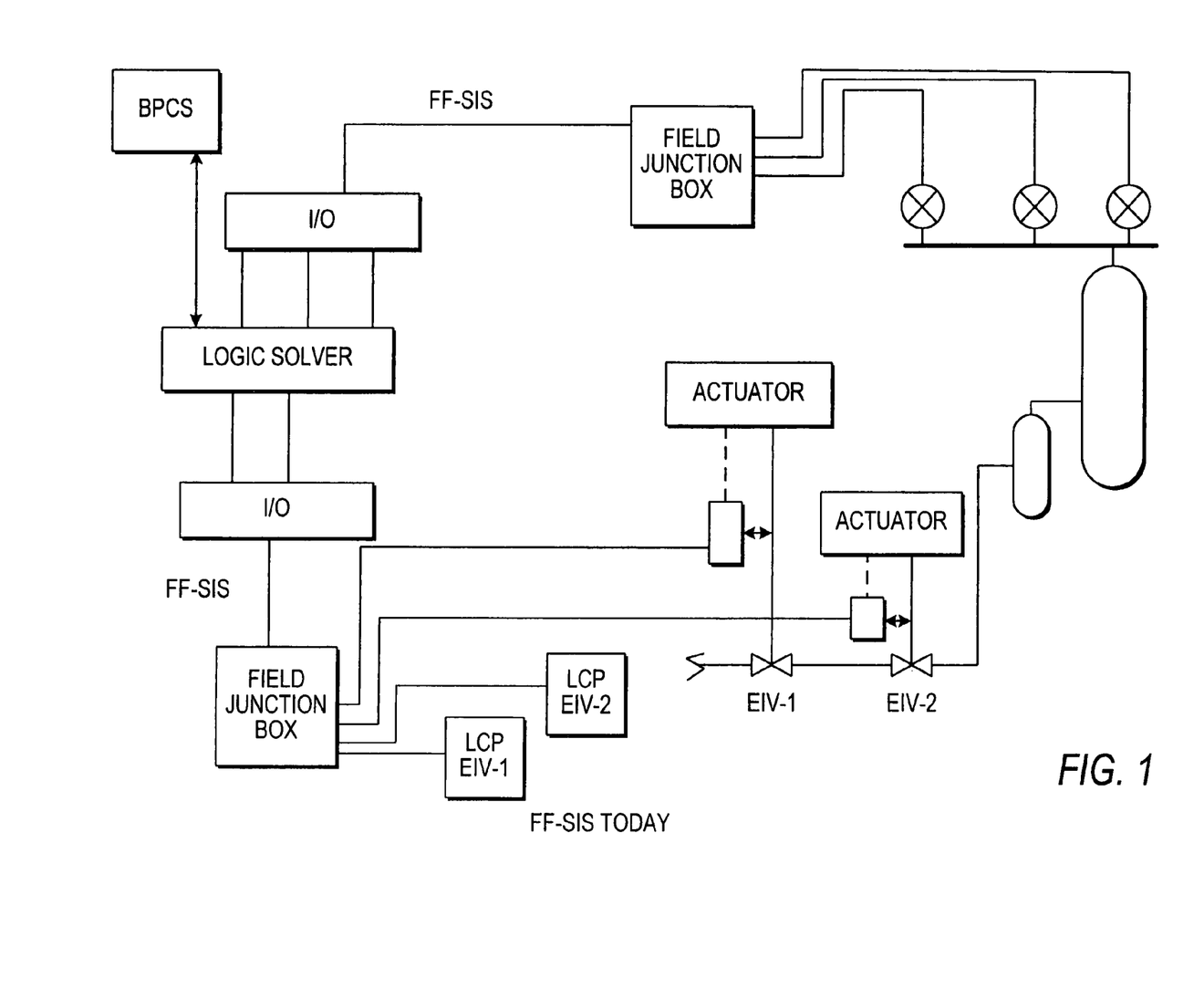
FIG. 1 shows a prior art FF-SIS system.

FIG. 1 shows the topology of a typical prior art safety instrumented system employing an FF-SIS network. The safety logic solver is hardwired, via input/output ("I/O") racks to field devices. These include sensors that monitor process variables such as pressure, temperature, fluid level, and flow, which are shown above the pressure vessel. The field devices also include final elements, such as the valve actuators and local control panels shown in association with isolation valves EIV-1 and EIV-2. As may be seen, a break in a wire could result in a loss of a signal from a sensor or final element, or loss of a control signal to a final device. Similarly, degradation in a signal could result in a false trip being initiated by the SLS.

By way of example, an EIV is open during normal operation and is closed during an emergency to stop the flow of hazardous or flammable material in the process. When the SLS receives a demand to isolate the process, either by an operator's manual action or when initiated automatically without operator intervention, the SLS will send a command to the EIV directing it to close. This is known as a demand signal, and the action of the valve is the "fail-safe" response. (While the fail-safe mode is typically to close, in the case of emergency isolation valves, it may be to open in the case of other types of valves, such as blowdown or depressurization valves.) It is accepted practice within the industry to design each EIV to "fail-safe" on safety demand and on mechanical failure (loss of actuator supply pressure) or upon loss of communications with the SLS. The mechanical failure action is dictated by the design of the actuator on the valve body and is outside the scope of the present invention.

The present invention reduces the risks associated with the loss or degradation of signals in a hardwired network, by also using wireless technology to provide a redundant communications path from each field device (sensor and final element) to the SLS. When a degraded communication is detected, the wireless signals are verified and compared with the primary FF-SIS communications signals prior to taking action.

The SP100 is preferred for use as the redundant communication network in the SIS of the present invention. The SP100 wireless standard for process automation system is applicable to industries such as oil and gas, petrochemical and manufacturing. The SP100 standard is intended for use in the 2.4 GHz band. Data can be transferred at speeds of up to 250 kbps within 100-400 meters. The power consumption and data rates of the SP100 devices are low as compared to a wireless Local Area Networks ("LAN") and the like.

The invention introduces combined logic and design components that convert hardwired and wireless networks into a redundant and highly reliable system. The logic consists of mapping both FF-SIS Bus and SP100 wireless communications network states to a decision matrix. For each state, certain activities and/or actions must be performed by the control logic, both at the SLS level and also at the field level. The resulting logic will maximize the likelihood of tripping when required by process conditions, while minimizing the likelihood of false tripping.

Figure 2:
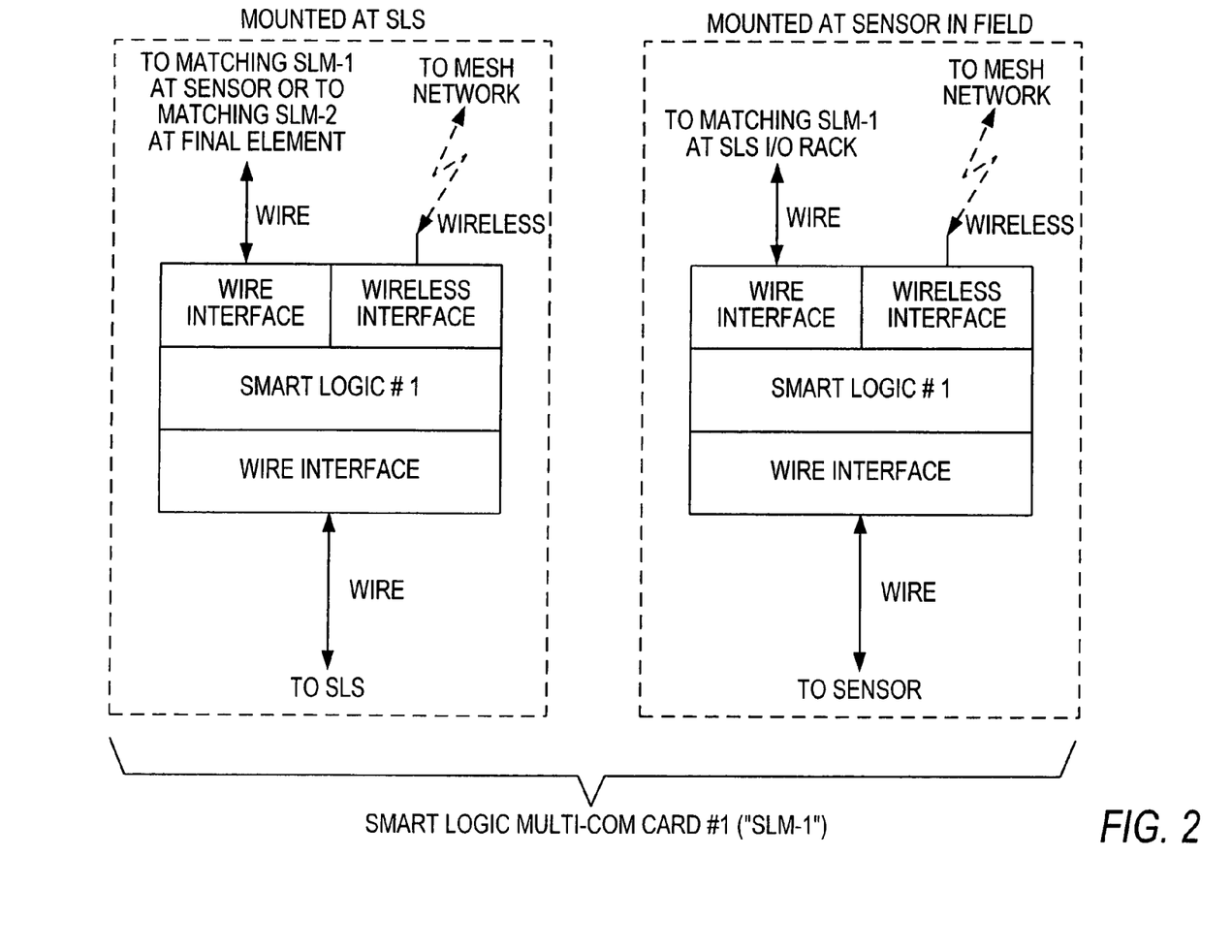
FIG. 2 shows one implementation of a Smart Logic Multi-Com card which allows field devices to communicate with the SLS over both the FF-SIS and SP100 networks, and which includes smart logic for final elements.
Figure 3:
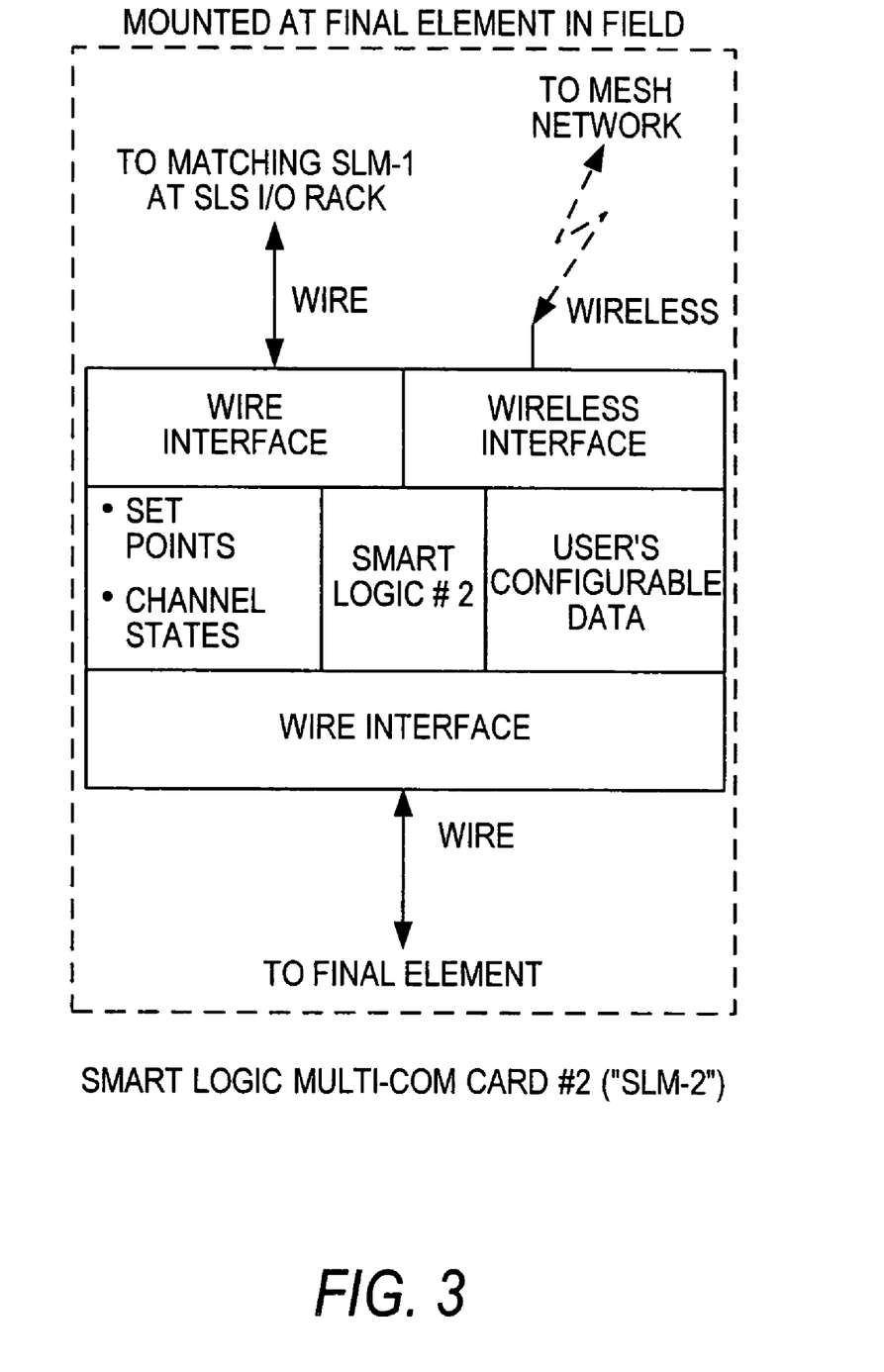
FIG. 3 shows another implementation of a Smart Logic Multi-Com card, with enhanced smart logic for final elements.

FIGS. 2 and 3 show two variations of a Smart Logic Multi-com card ("SLM-1" and "SLM-2," respectively), to be mounted at I/O racks associated with the SLS, and also to be mounted at field devices, and which allow the SLS and field devices to communicate with each other via both the FF-SIS hardwired network and the SP100 wireless network. The SLM cards utilize ports for wired communication and wireless communication that are preferably independent in terms of hardware, so that the failure of one does not necessarily result in a failure of the other. Each field device will be hardwired to a local SLM card, with a corresponding SLM card mounted at the SLS I/O rack.

SLM-1 is to be mounted at the SLS I/O rack and at sensors in the field. SLM-2 has additional memory and software, which it uses for storing set points and other user configurable data, so that it has enhanced safety-related "logic in the field" capabilities. It is to be mounted only at final elements.

For a SLM-1 mounted at the I/O rack associated with the SLS, the card will receive an outgoing signal from the SLS and multiply the signal for transmission to the field, passing one copy of the signal to the card's wire interface output port, and transmitting the other copy of the signal through the card's wireless output port and antenna. The card will also receive signals from the field. The card includes smart logic, and will use that to compare the two signals and select the best one, which it will pass to the SLS. If either or both signals is deficient, the card will report this to the system.

In addition to a wireless network providing a redundancy to the hardwired network, another benefit is that a wireless network provides for a true mesh topology. This allows every device to communicate with every other device, a topology referred to as a mesh network. This benefit is unavailable with other common topologies, such as the ring network, star network, or bus network (the FF-SIS being a type of bus network). The addition of a mesh network allows final devices, where properly programmed, to perform safety-related "logic in the field," by which a final device may receive information from a sensor and act accordingly, without requiring instruction via the SLS. Therefore, in a preferred embodiment, a field device is integrated with hardware and software that has the ability to perform the communications checks for both the FF-SIS and SP100 networks and take the user-defined action for the intended safety application.

In another preferred embodiment, each of the process sensors and the final elements communicate back to the SLS, which monitors not only the process but also when the devices experience failures or blocked sensor ports, thus capitalizing on the extended diagnostic capabilities afforded by the current protocols and through state-based decision logic.

In a preferred embodiment of the invention, the final element is provided with an automated failure-state adaptive configuration. With the redundancy provided by the wired and wireless communications paths, the response of each final element controller to faults in the communications paths can be adapted automatically to avoid unwanted nuisance trips and maximize safe operations. Each field device is programmed with internal logic to make the decision to fail-steady, e.g., keep the valve open, fail-safe, e.g., close the valve and isolate the process, or fail-safe after a defined delay, e.g., allow time to take corrective action. The use of FF-SIS as a safety-certified communications network to ensure that an alarm is presented to the operator when communications or a device fault is detected and the use of the wireless back-up communications path are particular advantages derived from use of the invention.

Another novel aspect is the overall design and messaging in which each field device communicates using two completely independent drivers and two independent separate communications paths to the SLS. In an alternative embodiment, logic for a specific "instrumented protective function" ("IPF") to be performed in the field and redundant communications exist between each device that makes up the IPF. Another aspect of this invention is the ability to check for common communications faults for a cluster of field devices within a common area to determine if the fault is common to many instruments. This capability is not known in the prior art and a user must trip upon lost communications when fail-safe action is required or to fail-steady and risk the loss of the ability to respond in a real emergency.

The defined action upon degraded or lost communications is determined in accordance with the present invention. In the case of either mechanical failure or communications failure, the decision to design for "fail-steady" action is based on an analysis that balances the process tolerance for an uninitiated trip (with its potential for damage and loss of product) against the risk of not responding to a real safety demand within the required safety process time. This is referred to as the Safety Integrity Level ("SIL"). The FF-SIS communications protocol provides the end user with the capability of going beyond conventional on/off control by defining the failure action of each field device on loss of communications in a three-tier method:

1. Action upon detected communications errors when the safety demand message is still getting through, e.g., degraded communications;
2. Action upon complete loss of communications, e.g., the safety message is not getting through; and
3. Loss of communications and device power with a complete open circuit between the SLS and the field device.

The SP100 carries different types of frames categorized into classes of services. The categorization of the frames is that: class 0 is critical for safety applications (such as emergency shutdown systems); class 1 is for closed-loop regulatory control; class 2 is for closed-loop supervisory control; class 3 is for open-loop control; class 4 is for alerting messages; and class 5 is for data logging. Certain events, such as alarming, can have different classifications of service depending on the message type.

The SLS may receive multiple frames from each field device. In addition to a frame received from the hardwired FF-SIS network, multiple frames may be received from the SP100 mesh network, i.e., the SLS may receive a frame directly from a particular field device, and may also receive frames for that device via different wireless paths. The invention permits receipt and processing of these multiple frames by assigning a quality control digit ("QCD") to each frame. The SLS will then act based upon the frame that has the highest QCD.

When the SP100 wireless communications network is functional, the end user will have the flexibility of keeping field devices active and the process operating at normal conditions while appropriate action is taken to address the faults detected in the FF-SIS communications path. Should the wireless communications path be lost prior to the correction of the detected FF-SIS communications faults, each device takes the defined safe action for the tier of FF-SIS communications loss and wireless loss. If a real process demand is received at any time via the wireless or FF-SIS communications paths, the final element will move to its fail-safe position, thereby providing a 1-out-of-2 action upon receipt of a verified real safety demand.

Figure 4:
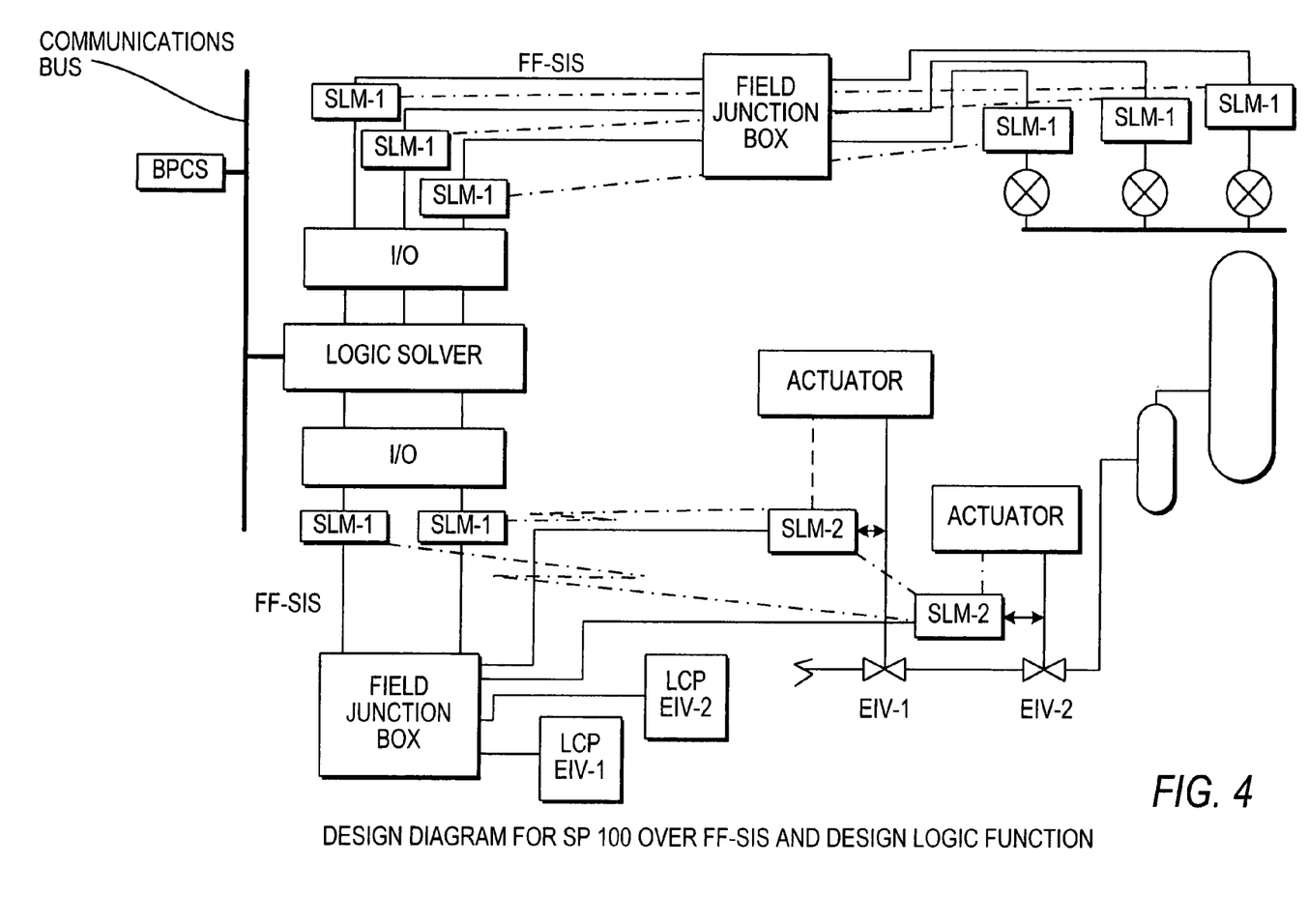
FIG. 4 shows a topology of the invention in which FF-SIS and SP100 networks are combined to produce a redundant, very reliable system.

FIG. 4 shows the new system architecture of the invention, which provides a safety system that maximizes the probability that the system will respond to a true demand signal while avoiding the need to take a process offline due to communications errors, failures and/or faults. The two paths of communications provided by the invention allow the process to remain in service even when a communications error is detected in one of the paths and while follow-up troubleshooting and maintenance is underway. This flexibility is self-generated by field devices within the Safety Instrumented System. Once installed and programmed with standards, limits and the like (which are predefined at the time each device is configured based upon process safety requirements), the system will require no human physical intervention or interpretation of data.

Figure 5:
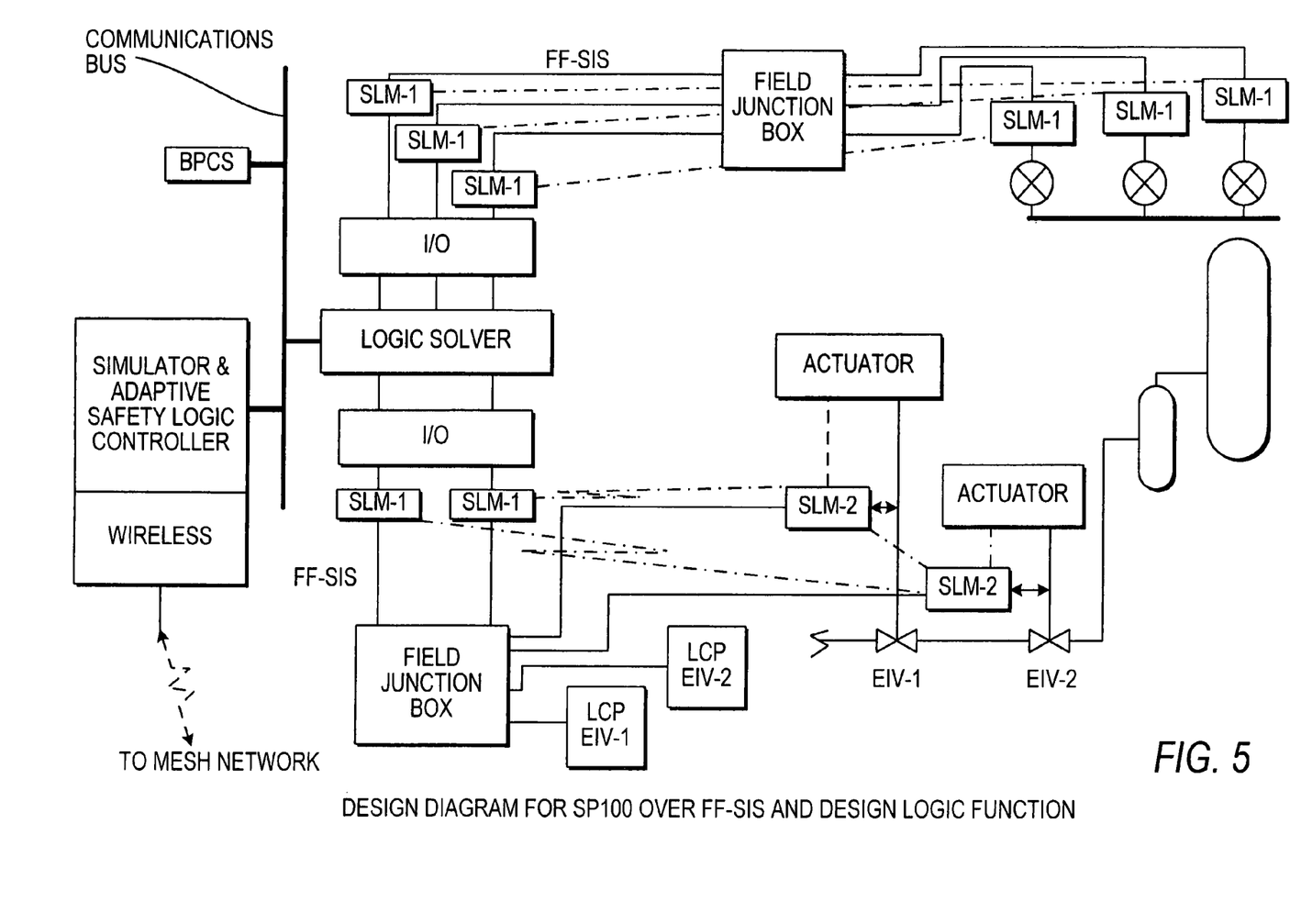
FIG. 5 shows another embodiment of the system, incorporating a Simulator and Adaptive Safety Logic Controller.

In an alternate embodiment, shown in FIG. 5, a Simulator and Adaptive Safety Logic Controller ("SASLC") is added, which can complement the safety logic provided by the SLS. Whereas the SLS typically makes decisions based on a "static" view of the process conditions, the SASLC addresses the dynamics of the process over time due to changes in plant capacity, rate of production, newly introduced technology, etc., which may affect the process and subsequently change the operating ranges and safety thresholds. The SASLC functions by using simulations to make real-time predictions as to the process states, dynamics, and the required safety actions. The SASLC adapts to these changes and updates the operating ranges and safety threshold parameters at the SLM-2 cards.

Packet communication between the SASLC and SLM-2 cards will typically include the following fields: destination and source addresses, message type and length, message sequence number, priority, Cyclical Redundancy Checking ("CRC") and message integrity bits, with provision for future extensions. In addition, the packets will include a payload message, command, or threshold or range updates, depending on the application. Messages sent from the SLM-2 to the SASLC will include a payload, requesting a decision whether to fail steady or fail safe. These messages will typically be needed or transmitted when the SLM-2 loses communications with the SLS or as programmed by the process designers/users. In response, the SASLC will send a command back to the SLM-2, with a decision as to fail steady or to fail safe. Such a signal may also be initiated by the SASLC when a process event occurs which the SLS ignores, but which the SASLC considers to warrant a fail safe signal. Such a process event, or other abnormal conditions arising from changes to the plant, such as production rate, capacity, etc., may also result in the SASLC communicating a revised threshold or range to an SLM-2.

The arrangement of the FF-SIS and SP100 communications networks is unique to this invention, and provides for a complete end-to-end functional testing and verification of both communications networks. This results in improved safety via one-out-of-two action on a true demand signal and avoids nuisance trips, by allowing the process to continue to operate despite degraded communications of the FF-SIS communications path, as long as the wireless SP100 link is healthy.

Combining FF-SIS and wireless communications in accordance with the invention provides redundant and diverse communications paths so that as and when a fault is detected at a valve controller or process sensor, operations will be alerted and can take action to perform the required maintenance without an adverse impact on safety or production. Where desired by the end-user, the process will only be shut down when a true demand signal is sent by the SLS or when both communications paths have failed and a pre-defined time limit is exceeded. These expanded configurable device options constitute a significant improvement over the prior art.

Using the SIL target described above as one input to the logic of the present invention introduces the "risk" element into the decision-making process as to whether to fail-steady, fail-safe without delay, or to fail-safe after a delay, when communications errors are detected. For critical SIL3 applications, and for some SIL2 applications, redundancy will be designed into the system. The associated final elements will thus have a "neighbor list," a group of devices that will be tripped together simultaneously by a common SLS demand signal. For example, if a wireless enabled smart safety instrument ("WESSI") valve controller is used in a SIL3 SIF and it experiences communications errors, if one of the redundant final elements in its neighbor list produces a "no error detected" signal and no trip signal is present, a fail-steady decision can be taken. However, if a check of the neighbor indicates that an error was also present in the redundant final element, because of the high risk associated with SIL3 applications, a fail-safe trip response would be appropriate. SIL2 and SIL1 are less serious, and could therefore be weighted to a fail-steady response.

The system and method of the invention have the advantage of permitting users to gradually adopt a logic in the field system without making any change to an existing wired system or wireless system. The logic in the field system allows a decentralized SIS whereby the SLM cards at the field devices perform the logic tests and analysis rather than the centralized SLS doing so. In this embodiment, the SLS acts to record and monitor for system performance and safety. The invention uses the SLS as a bypass to messages going from the sensors to the valves. Thus, no change is required to the wireless or wired systems when adopting the logic in the field system.

The method of the invention utilizes the mesh topology to minimize single point of failure and thereby maximize the reliability of transmitted packets over the wireless SP100 networks. The quality of the communication signals between neighboring field devices and the SLS will provide additional information to the system logic.

More importantly, because each field device and application process has multiple paths through the mesh to communicate its information, the system is able to accommodate failed devices and changes in the operating environment. Just as importantly, it increases the ability to communicate around a plant's obstacles, thereby simplifying installation.

The wireless connectivity of the invention avoids many of the limitations of traditional SIS logic. Under the prior art hardwired systems, obtaining direct information from various components is not practical, due to the great amount of wiring that would be required. In accordance with the invention, obtaining and disseminating information between devices is easily accomplished. Furthermore, distributed SIS or logic in the field, can be supported by communications between wireless enabled devices.

The specific aspects of the present invention include the following features:

1. The invention incorporates an SP100 wireless system as an integral part of an FF-SIS wired system, whereby new message frames are carried over the wireless SP100 network to boost decision reliability for a Safety Instrumented System.

2. The invention defines three decision outcomes:
   a. Fail-Steady: Continue steady-state operation of the system.
   b. Fail-Safe Without Delay: Trip immediately.
   c. Fail-Safe With Delay: A timer begins to run, and the system will trip when the time elapses, unless there is a relevant change in the communications connectivity or a prescribed scenario or events occur. If there is such a relevant change or the prescribed scenario or events occur, the system will instead fail-steady or fail-safe without delay, as appropriate in light of the status change.

3. The invention introduces state-based logic and design components that convert hardwired and wireless networks into a fully redundant and very reliable system. The invention maps the states of communications connectivity for both the FF-SIS and SP100 networks, applies the SIL target and diagnostic and decision logic, and executes control, alarming, and logging functions, as appropriate. The control functions may be initiated at the SLS and/or at the field level. The invention provides a more informed decision that will lead to (a) maximizing the likelihood of an emergency shutdown when the process condition is indeed in need of this action; and (b) minimizing the likelihood of tripping when the networks' conditions are primarily problems in the system and not with process condition(s).

4. The invention receives multiple frames from the same source, with some arriving to the SLS over the FF-SIS bus and others over the SP100 wireless system. Because of the availability of multiple pathways with SP100 mesh networks, it is possible to transmit and receive multiple copies of the same frame over different wireless paths, thereby improving message delivery reliability. The SLS processes the multiple copies of each frame, assigning each a QCD, and selecting the copy of each frame that has the highest QCD. The information in that frame is then processed by the programmed logic.

Figure 6:
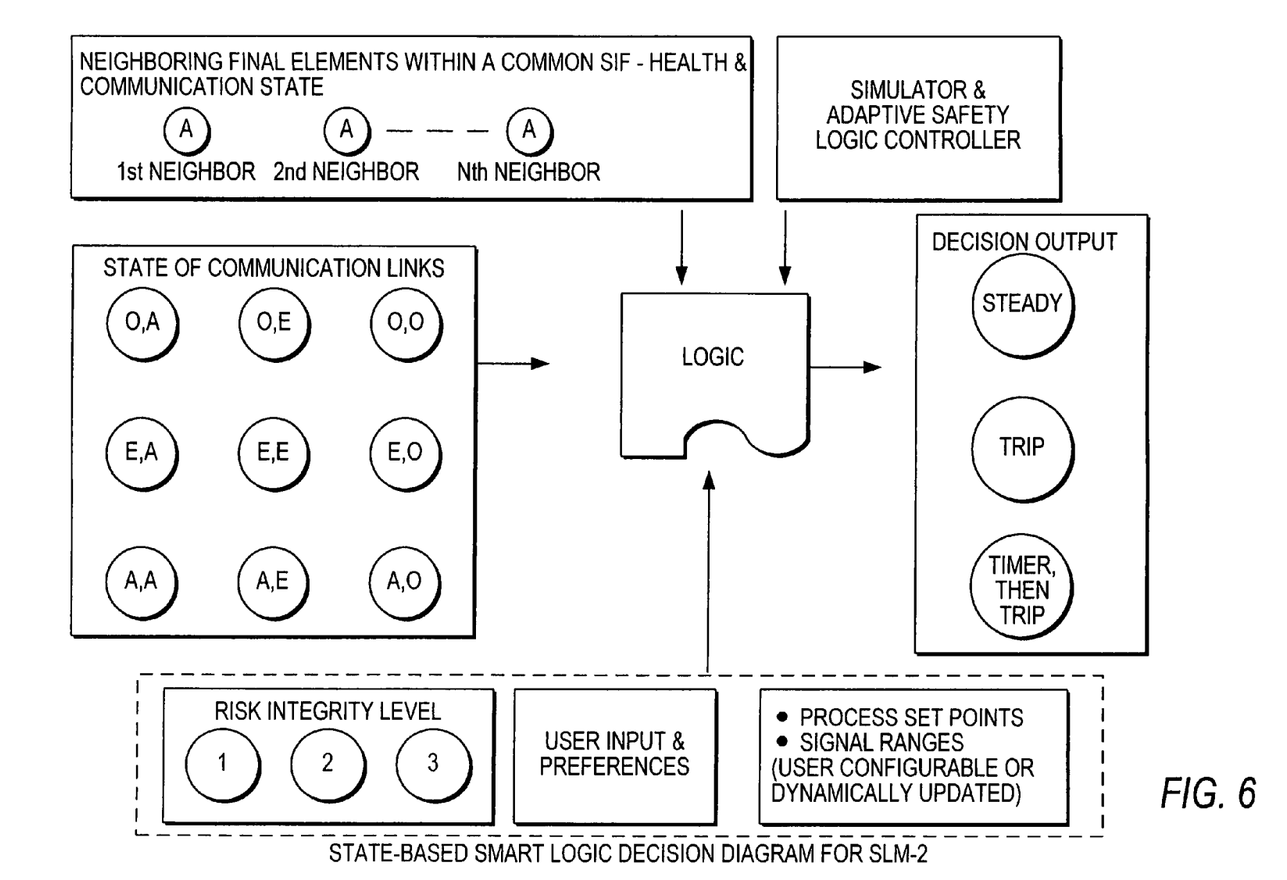
FIG. 6 shows a logical diagram of the invention.

FIG. 6 is a decision logic diagram which depicts various inputs and outputs performed as "logic in the field" within SLM-2. The inputs to the design logic are:

1. The communication connectivity for a particular final device, modeled by a Markovian chain. The first variable in each Markovian chain is the connectivity of the FF-SIS network and the second variable is the connectivity of the SP100 network. The network states are either "A" for Active and in good condition, "E" for erroneous, (i.e., to reflect high frame error rate), or "O" for open circuit or no communications.

2. The second input is the SIL, user input/preferences, and setpoint ranges (lower box).

3. The third input is the connectivity states with the SLS for the neighbor within the safety function, where "A" means active, and "O" means it is open, i.e., "no communications," and "TP" means tripped.

4. The fourth input is the connectivity states with the SLS for the neighboring safety function, where "A" means active, and "O" means it is open, i.e., "no communications", and "TP" means tripped.

The connectivity states, neighbor states, and SIL are all used as an input to the logic of this invention to determine the output decision. The output decision is either: (1) "Action 1": Remain Steady; (2) "Action 2": trip immediately; (3) "Action 3": set timer before trip; should the state of connectivity change or particular events occur during the time set, the decision outcome will shift from "Action 3" to "Action 1" or "Action 2." The logic performs as follows during the following states:

1. "Brown state" (this is any of states A,A; A,E; A,O; E,A; or O,A): continue steady, select the frame with the highest QCD.

2. "Yellow state" (this represents state E,E): continue steady, when negative acknowledgment ("NACK") or timeout occurs as a result of a transmitted frame, the system directs retransmitting "m" copies of the same frame; if three retransmission requests fail, the system shifts to the "red state."

3. "Blue state" (this represents either state E,O or state O,E): continue steady, when NACK or timeout occurs as a result of a transmitted frame, the system directs retransmitting "m" copies of the same frame for the network with the "E" state, with "m" representing a user-selected integer. If three retransmission requests fail, the system shifts to the "red state."

4. "Red state" (this represents state O,O): the final element's SLM-2 will send two multicast requests to the final element's neighbor list prior to tripping. The plant user can configure the SLM-2's logic, depending upon the application, SIL level, and other factors. In a typical ESD, the user may select the following logic, with parameter Y referring to the percentage of neighboring final elements within the SIFs that are in the tripped state, and Z referring to the percentage of neighboring final elements that have lost all communications with the SLS.

Case 1: Where Y=100%, Z=100%, SIL=3, and the final element in question is in the "red state," the SLM-2 should be programmed to "fail safe."

Case 2: Where Y=0%, Z=100%, SIL=1, and the final element in question is in the "red state," the SLM-2 should be programmed to "fail steady."

Case 3: Where Y=100%, Z=0%, SIL=2, and the final element in question is in the "red state," the SLM-2 should be programmed to "fail safe."

Case 4: Where SIL=2, and the communications between the final element and SLS are conducted with good QCD, the SLM-2 should be programmed to "fail steady."

Case 5: Where SIL=3, and the hardwired and wireless communications have failed completely (i.e., no contact with the SLS or the neighbor list), then the SLM-2 should be programmed to "fail safe."

The check for loss of communications with neighboring SIF's (the parameter Z) is of use only to define a level of confidence in the communications to/from other final elements within the neighbor list. If any final element in a neighboring SIF is in communications with the SLS and has been tripped by an SLS demand, then its neighboring final element that has lost all communications with the SLS should also trip. A timer of "T" can be used as part of configuration parameters.

This invention addresses all the previously-noted deficiencies of conventional ESD system design of the prior art. This is possible because (1) enabled by the unique combination of the FF-SIS hardwired and SP100 wireless communications, this invention provides the required redundancy and reliability of communications; and (2) the state-based decision logic facilitates merging the two technologies and establishes a decision criteria to maximize the likelihood of "tripping the system" when the industrial process condition actually requires that, and minimizing tripping the system when normal process conditions prevail, but when a communication system fault occurs.

In summary, the present invention combines hardwired communications with a backup wireless link to each field device. The invention provides a method of monitoring the two communications paths to adapt the response to communication faults, providing the flexibility to continue to operate even in the presence of communications errors. By combining FF-SIS and SP100 wireless, the system alerts operating personnel to a dangerous failure or a degraded communications performance level when it is detected in real time, rather than having to wait for a manual check of the system or taking the process to the safe state by an uninitiated shutdown.

The system of the invention provides the user with the level of device communications redundancy necessary to perform maintenance and trouble-shooting while the system is on-line without an adverse impact on production. The system also meets the international standards requirements for architecture and probability of failure on demand for Safety Instrumented Systems under IEC 61511.

The system of the invention provides the end user with greater flexibility to configure failure action of the ESD final elements to "fail-steady" when device or communications faults are detected. Safety is increased as a true demand signal is acted on when received by either the primary FF-SIS communications network or the wireless link.

With the use of the new embedded communications logic of the invention, a final element, e.g., a device such as a valve controller, has the capability of monitoring the redundant communications paths between the individual device and the SLS, and between the individual device and other field devices to determine the seriousness and extent of the communications fault. With this capability, the final element is able to adaptively use the predefined failure modes to maximize safety operations while avoiding unnecessary process disruptions and nuisance trips.

The potential for major capital savings made possible with the implementation of FF-SIS has been well documented in the industry. The present invention takes advantage of the benefits of the FF-SIS technology and further enhances the overall SIS and provides additional savings on major engineering projects.

In addition, the present invention will reduce the potential for nuisance trips thereby resulting in savings to operations as the communications faults are detected and provides for "fail-steady" action without loss of the overall safety function. These advantages are not present in the conventional emergency shutdown systems of the prior art that are in use today.

Although several embodiments of the system and apparatus of the invention have been described in detail, various other modifications will be apparent to those of ordinary skill from this description and the full scope of the invention is to be determined by the claims that follow.

We claim:

1. A safety instrumented system for monitoring and controlling a plurality of process field devices including sensors and final elements, the system comprising a safety logic solver, a plurality of multi-communications cards, a hardwired communications network, and a redundant wireless communications network, in which a pair of said multi-communications cards is associated with each field device, with one card of the pair being provided at the field device, and the other card of the pair being provided at the safety logic solver, in which the cards include a means for transmitting and receiving signals between the field devices and the safety logic solver over both the hardwired and wireless networks, and in which each said card located at a final element having means for performing smart logic to control the final element.

2. The system of claim 1 in which the multi-communications cards verify the operability of the wireless communications network with each of the plurality of field devices by comparing the wireless communications signal from that field device with the corresponding healthy hardwired signal from the same device.

3. The system of claim 2 which is programmed to determine the operability of the wireless system continuously and alert the safety logic solver when any device has degraded or lost wireless communications.

4. The system of claim 1 which includes memory for storing signals received over the hardwired and wireless networks during operation of the process, the signals corresponding to each of the plurality of field devices, and means for comparing each signal with a predetermined safe operating setpoint or range that has been saved in memory for the associated field device.

5. The system of claim 4 which includes means for utilizing the wireless signal input from process sensor transmitters to compare against a predetermined safe operating setpoint or range, should a failure be detected within the hardwired signal.

6. The system of claim 4 which includes means for utilizing the wireless signal output to a final element to communicate the safety demand trip signal, should a failure be detected within the hardwired signal.

7. The system of claim 4 which includes means for actuating a safety shutdown for all or a portion of the process if neither the wireless nor hardwired network signals is in a known healthy state.

8. The system of claim 4 which includes recording and display means for identifying a signal from a field device when communications errors are detected.

9. The system of claim 4, which includes both hardwired and wireless communications between a Simulator and Adaptive Safety Logic Controller and safety-related final elements.

10. The system of claim 9, in which the Simulator and Adaptive Safety Logic Controller links process data within the regulatory control system to safety-related final elements.

11. The system of claim 9, in which the Simulator and Adaptive Safety Logic Controller and the safety related final elements communicate in a packet mode, whereby the data streams comprise a destination and source address, message type, message length, message sequence number, priority, cyclical redundancy checking and message integrity bits.

12. The system of claim 9, in which the Simulator and Adaptive Safety Logic Controller provides updates to the final element smart logic process setpoints.

13. The system of claim 1 where the multi-communications cards verify the operability of wireless communications from sensors that monitor one or more of pressure, temperature, flow rate, fluid level and power consumption.

14. The system of claim 1 where the final elements include emergency isolation valves, flow rate control valves, valve actuators, pump controllers and motor starters.

15. The system of claim 1, in which the multi-communications card located at final elements will periodically or upon request broadcast the health condition and communications connectivity of the final element to a neighbor list of final elements within the same safety function.

16. The system of claim 15, in which the smart logic within the multi-communications cards located at final elements, in deciding whether to shutdown the associated final element, will consider the signal conditions of the hardwired and wireless networks, the safety integrity level for the safety process, the health condition and communications connectivity of neighboring devices, and user configuration logic for action upon degraded or lost communications.

17. The system of claim 16, in which the multi-communications cards located at final elements will use the hardwired network to send an alert signal to the safety logic solver upon loss of communications connectivity over the wireless network.

18. The system of claim 16, in which the smart logic within multi-communications cards located at final elements, upon detecting a loss of communications over both the hardwired and wireless networks, will delay for a period of time that is dependent upon the safety integrity level, after which if communications have not been restored over at least one of the networks, the smart logic will shut down the associated final element.

19. The system of claim 1, in which the smart logic within the multi-communications cards located at final elements, in deciding whether to shutdown the associated final element, will consider the signal conditions of the hardwired and wireless networks, the safety integrity level for the safety process, the health condition and communications connectivity of neighboring devices, and user configuration logic for action upon degraded or lost communications.

20. The system of claim 19, in which the multi-communications cards located at final elements will use the hardwired network to send an alert signal to the safety logic solver upon loss of communications connectivity over the wireless network.

21. The system of claim 19, in which the smart logic within multi-communications cards located at final elements, upon detecting a loss of communications over both the hardwired and wireless networks, will delay for a period of time that is dependent upon the safety integrity level, after which if communications have not been restored over at least one of the networks, the smart logic will shut down the associated final element.

22. The system of claim 1, in which the multi-communications cards located at final elements will use the hardwired network to send an alert signal to the safety logic solver upon loss of communications connectivity over the wireless network.

23. The system of claim 1, in which the smart logic within multi-communications cards located at final elements, upon detecting a loss of communications over both the hardwired and wireless networks, will delay for a period of time that is dependent upon the safety integrity level, after which if communications have not been restored over at least one of the networks, the smart logic will shut down the associated final element.

24. The system of claim 1, wherein the wireless network uses SP100, IEEE 802.11, IEEE 802.15, Wireless LAN, or Wireless Hart protocols.

25. The system of claim 1, in which the smart logic of the multi-communications cards located at final elements may be user-configured as to when to fail-safe, fail-steady, or to set a countdown timer after which to move the associated final elements to a fail-safe position.

26. A method of providing two paths of communication between a process safety logic solver and a plurality of field devices employed to monitor and control the process, the method comprising:
- providing a hardwired communication network operatively connected to the safety logic solver and each of the plurality of field devices; and
- providing a wireless communication network operatively connected to the safety logic solver and each of the plurality of field devices,
- providing an integral smart logic capability within the multi-communications cards located at final elements, which in deciding whether to shutdown the associated final element will consider the signal conditions of the hardwired and wireless networks, the safety integrity level for the safety process, the health condition and communications connectivity of neighboring devices, and user configuration logic for action upon degraded or lost communications,
- whereby signals initiated by and transmitted between the safety logic solver and the plurality of field devices are transmitted over both the hardwired and wireless networks.

27. The method of claim 26 which comprises:
- checking for the communications health of the hardwired signal received from a field device;
- checking for the wireless signal health from the same corresponding field device;
- utilizing the healthy signal from the hardwired network for comparison against a predetermined safe operating setpoint or range in the case of a process measurement or to transmit the safety demand to a final element.

28. The method of claim 27 which includes continuing the operation of the process if the wireless signal is healthy and the hardwired signal is degraded or failed.

29. The method of claim 27 which includes the configurable use of an alternative healthy field device to provide the process measurement or required safety logic solver output action when neither the hardwired or wireless signals for the primary device is healthy.

30. The method of claim 29 which includes identifying the field device where degraded or failed communications occurred.

31. The method of claim 29 which includes activating the programmed safety shutdown when no signal has been communicated over either network for a predetermined period of time and when there is no suitable alternative healthy process field device to provide the process measurement or required safety logic solver output action.

32. The method of claim 26 which includes providing multiple user-defined communications failure states configured within memory at the multi-communications card for a field device, which will take into account whether the hardwired and/or wireless communications is degraded or lost, and the risk level and hardware configuration of the safety function involved, and then will decide whether the device should fail to a steady state, fail to a safe position, or begin a countdown after which the device will fail, absent a recovery of the communications failure.

33. A field-mounted multi-communications card that communicates with a safety logic solver via a primary hardwired communications network and via a redundant wireless communications network, in which the card can be user-configured to utilize the wireless communications path when failed or degraded communications are detected on the hardwired network.

34. The multi-communications card of claim 33, which upon failed or degraded communications on the hardwired network will use the wireless communications path to feedback parameters from an associated final element to the safety logic solver, and either allow the associated final element to remain in service, or trip it upon receiving a trip signal from the safety logic solver.

35. The multi-communications card of claim 33, which upon failed or degraded communications on the hardwired network will use the wireless communications path to feedback parameters from an associated sensor.

* * * * *